United States Patent [19]
Chuang

[11] Patent Number: 5,898,965
[45] Date of Patent: May 4, 1999

[54] INFLATION AND REPAIR DEVICE FOR BICYCLE TIRES

[76] Inventor: Louis Chuang, 7th Floor - 8, No. 20, Ta Lon Road, Taichung, Taiwan

[21] Appl. No.: 08/971,646

[22] Filed: Nov. 17, 1997

[51] Int. Cl.⁶ ........................................................ B25F 1/00
[52] U.S. Cl. ................................. 7/170; 417/236; 157/1.3
[58] Field of Search ........................ 7/100, 170; 417/236; 157/1.22, 1.3

[56] References Cited

U.S. PATENT DOCUMENTS 5,715,554   2/1998   Downs et al. ........................... 7/100 X

*Primary Examiner*—James G. Smith
*Attorney, Agent, or Firm*—Charles E. Baxley, Esq.

[57] ABSTRACT

An inflation/repair device for bicycle tires includes a pumping device including a head, a handle, and a piston rod having a first end slidably received in the head and a second end securely attached to the handle move therewith. The handle is releasably, securely engaged with an axle of a wheel. A tire removing/mounting member is mounted the head to engage with an inner peripheral end edge of a tire mounted on a rim of the wheel for removing the inner peripheral end edge of the tire out of the rim or mounting the inner peripheral end edge of the tire into the rim.

4 Claims, 5 Drawing Sheets

INFLATION AND REPAIR DEVICE FOR BICYCLE TIRES

BACKGROUND OF THE INVENTION

1. Field of the Invention

The present invention relates to a device which may provide inflation and repairing function for bicycle tires.

2. Description of the Related Art

Various kinds of bicycles are used as means for e.g., traffic, amusement, outdoor activities, etc. A cyclist generally carries all kinds of tools, e.g., a pump for inflating the tires, a lock for preventing the bicycle from being stolen, and small repair tools for re-tightening loosened parts, e.g., bolts, and for repairing a flat tire, which is especially important when in suburb, wild area, or mountain area. In some cases the cyclist has to carry further tools with him/her and thus is inconvenient. The present invention is intended to provide a multi-functional device which mitigates and/or obviates the above problems.

SUMMARY OF THE INVENTION

An inflation/repair device for bicycle tires in accordance with the present invention generally comprises a pumping device including a head having a chamber defined therein, a handle, and a piston rod assembly having a first end slidably received in the chamber of the head and a second end securely attached to the handle move therewith to thereby outputting air from the chamber. The handle includes means to be releasably, securely engaged with an axle of a wheel.

A tire removing/mounting member is mounted to the head to engage with an inner peripheral end edge of a tire mounted on a rim of the wheel for removing the inner peripheral end edge of the tire out of the rim or mounting the inner peripheral end edge of the tire into the rim.

In an embodiment of the invention, the head includes a stub formed thereon, wherein the stub includes a hole communicated with the chamber of the head, and the tire removing/mounting member is securely mounted around the stub. Preferably, the stub includes a plurality of annularly spaced notches defined therearound, and the tire removing/mounting member includes a number of protrusions formed on a side thereof to be respectively received in the notches.

In a preferred embodiment of the invention, the handle includes a recess which is defined by a longitudinal wall extending along a longitudinal direction of the handle and two lateral walls transverse to the longitudinal wall, and a receptacle is defined in the longitudinal wall and adapted to receive repair pieces for flat tires. Preferably, the means for releasably, securely engaging with the axle of the wheel includes a supporting member having an end pivotally mounted between the lateral walls defining the recess of the handle, while the supporting member includes a clamping section and movable between a stored position which is completely received in the recess to cover the receptacle and an operative position in which the clamping section is releasably, securely engaged with the axle of the wheel. Preferably, each lateral wall defining the recess includes at least one knurl formed thereon, and the supporting member includes a plurality of depressions defined in each of two lateral walls thereof for releasably receiving the knurls.

Other objects, advantages, and novel features of the invention will become more apparent from the following detailed description when taken in conjunction with the accompanying drawings.

DESCRIPTION OF THE PREFERRED EMBODIMENT

Figure 1:
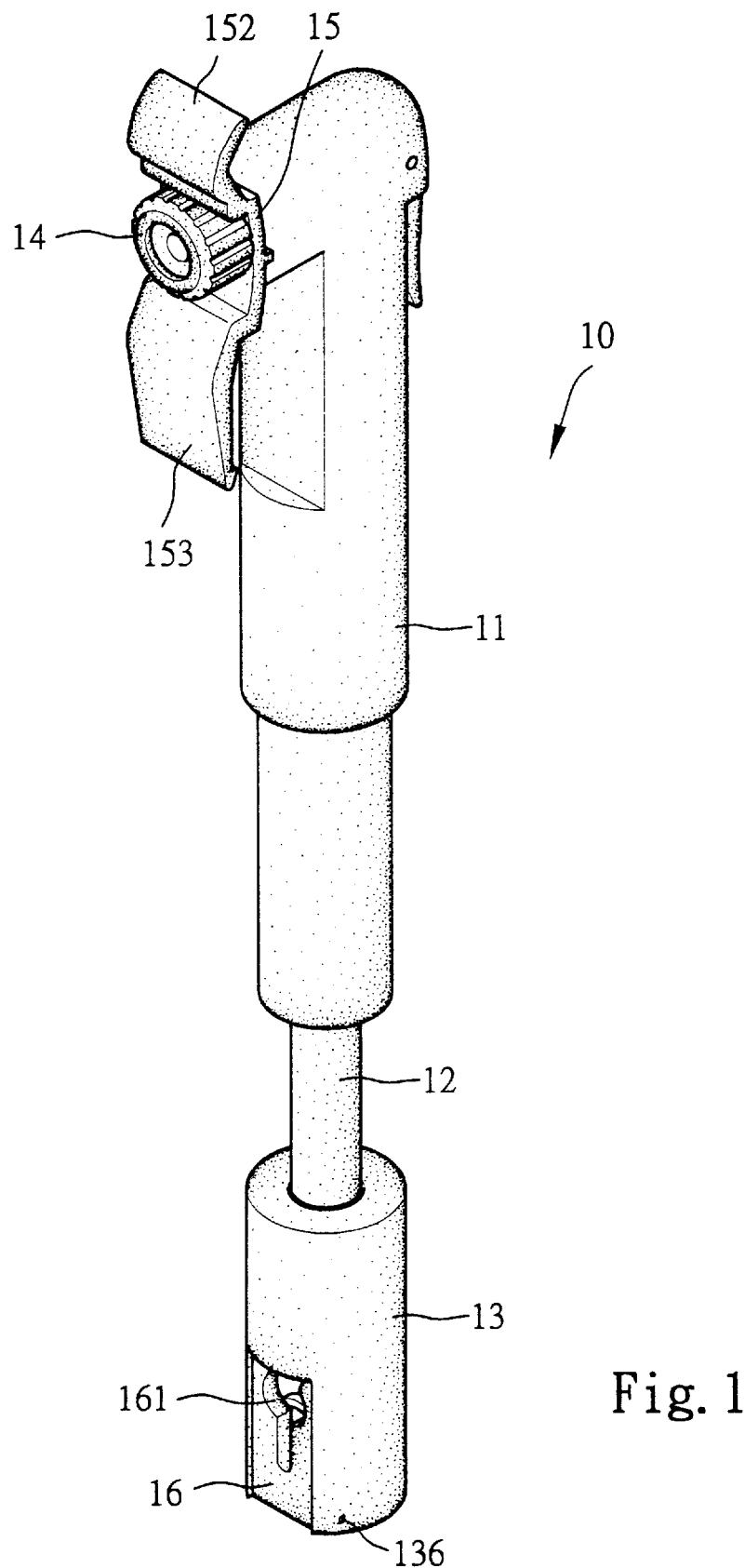
FIG. 1 is a perspective view of an inflation/repair device for bicycle tires in accordance with the present invention.
Figure 2:
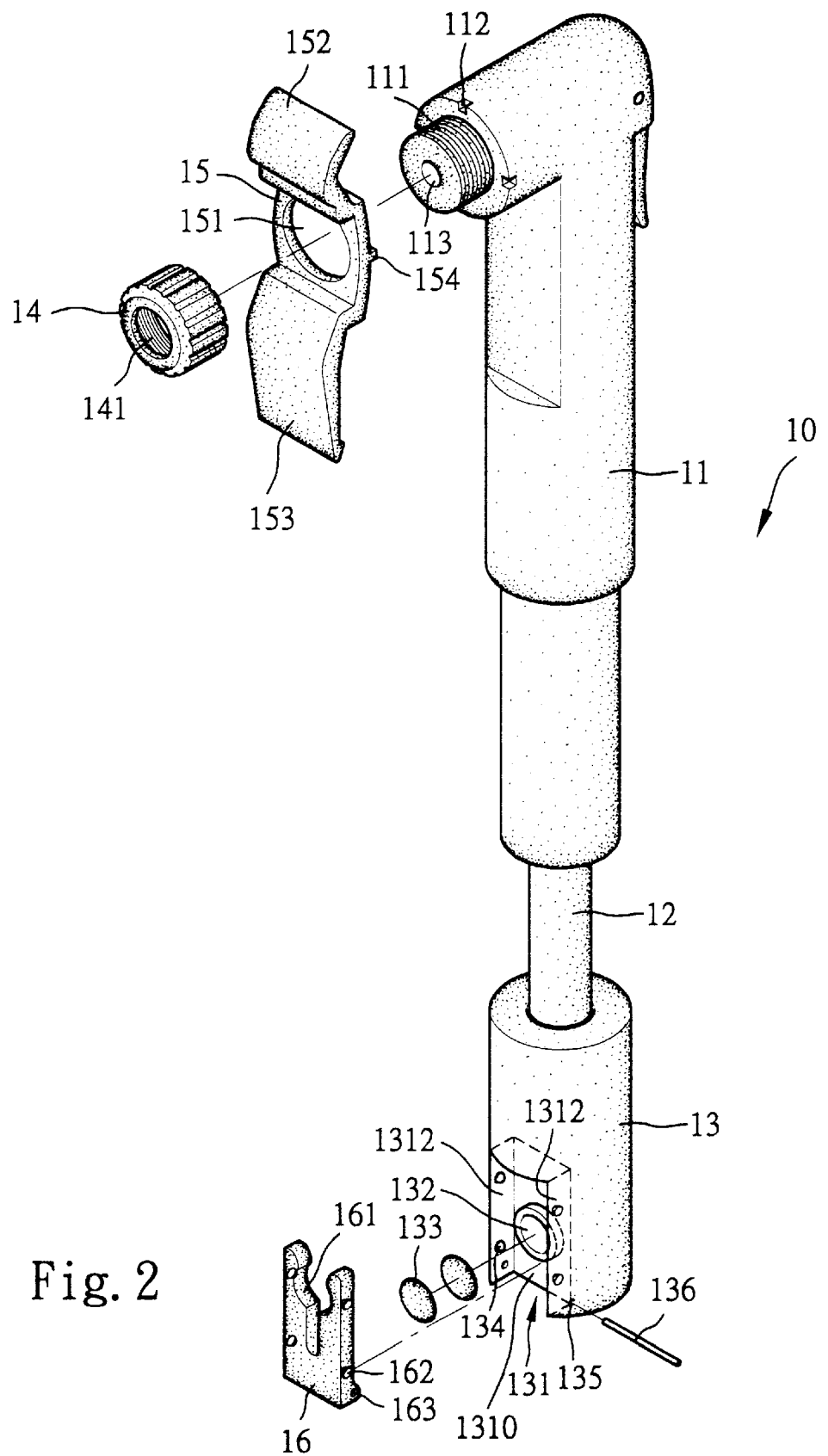
FIG. 2 is a perspective view, partly exploded, of the inflation/repair device for bicycle tires.

Referring to the drawings and initially to FIGS. 1 and 2, an inflation/repair device for bicycle tires in accordance with the present invention generally includes a pumping device 10 including a head 11 having a chamber (not shown) defined therein, a piston rod assembly 12 having an end slidably received in the chamber of the head 11, and a handle 13 to which the other end of the piston rod assembly 12 is securely attached to move therewith.

An end of the head 11 which is distal to the piston rod assembly 12 includes a stub 111 formed thereon and a number of annularly spaced notches 112 defined around the stub 111, best shown in FIG. 2. The stub 111 includes a hole 113 communicated with the chamber of the head 11. In addition, a tire removing/mounting member 15 is mounted around the stub 111 and is retained in position by means of threading engagement between an inner threading 141 of a cap 14 and outer threading of the stub 111. The tire removing/mounting member 15 includes a first section 152, a second section 153, and a mediate section interconnecting the first and second section 152 and 153, while a hole 151 is defined in the mediate section and through which the stub 111 extends. Further, a number of protrusions 154 are formed on a side of the mediate section to be respectively received in the notches 112 to provide a positioning effect for the member 15.

As shown in FIG. 2, the handle 13 includes a recess 131 which is defined by a longitudinal wall 1310 (extending along a longitudinal direction of the handle 13) and two lateral walls 1312 (transverse to the longitudinal wall 1310), wherein a receptacle 132 is defined in the longitudinal wall 1310 for receiving repair pieces 133 for flat tires, and two knurls 134 are formed on each lateral wall 1312. A supporting member 16 is pivoted to the handle 13 by means of extending a pin 136 through aligned pin holes 135 defined in the lateral walls 1312 and through a pin hole 163 defined in the supporting member 16 such that the supporting member 16 may be movable between a first stored position which is completely received in the recess 131 and a second operative position. The supporting member 16 includes depressions 162 defined in each of two lateral walls thereof for releasably receiving the knurls 134 on the lateral walls 1312 defining the recess 131 to thereby provide a positioning effect when in the stored position. Further, the supporting member 16 includes a clamping section 161 which, when in the operative position, may securely, releasably clamp an axle 21 (FIG. 5) of a wheel.

When inflating a tire, the handle 13 is operated to reciprocate the piston rod assembly 12 such that air may be outputted via the hole 113 to the tire, which is conventional and therefore not further described.

Figures 3, 4:
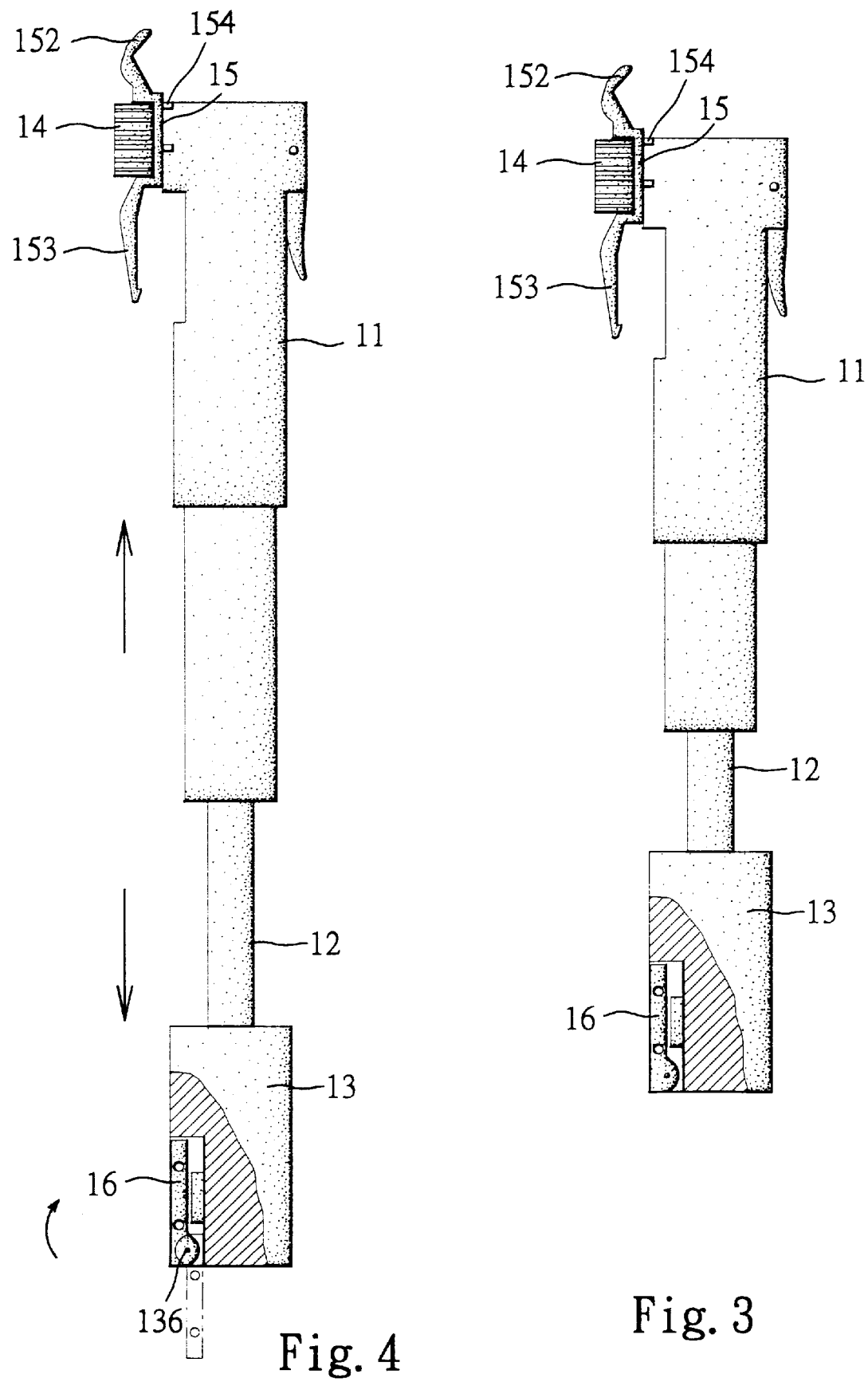
FIG. 3 is a side view, partially sectioned, of the inflation/repair device.
FIG. 4 is a side view similar to FIG. 3, illustrating extension of a piston rod assembly.
Figure 5:
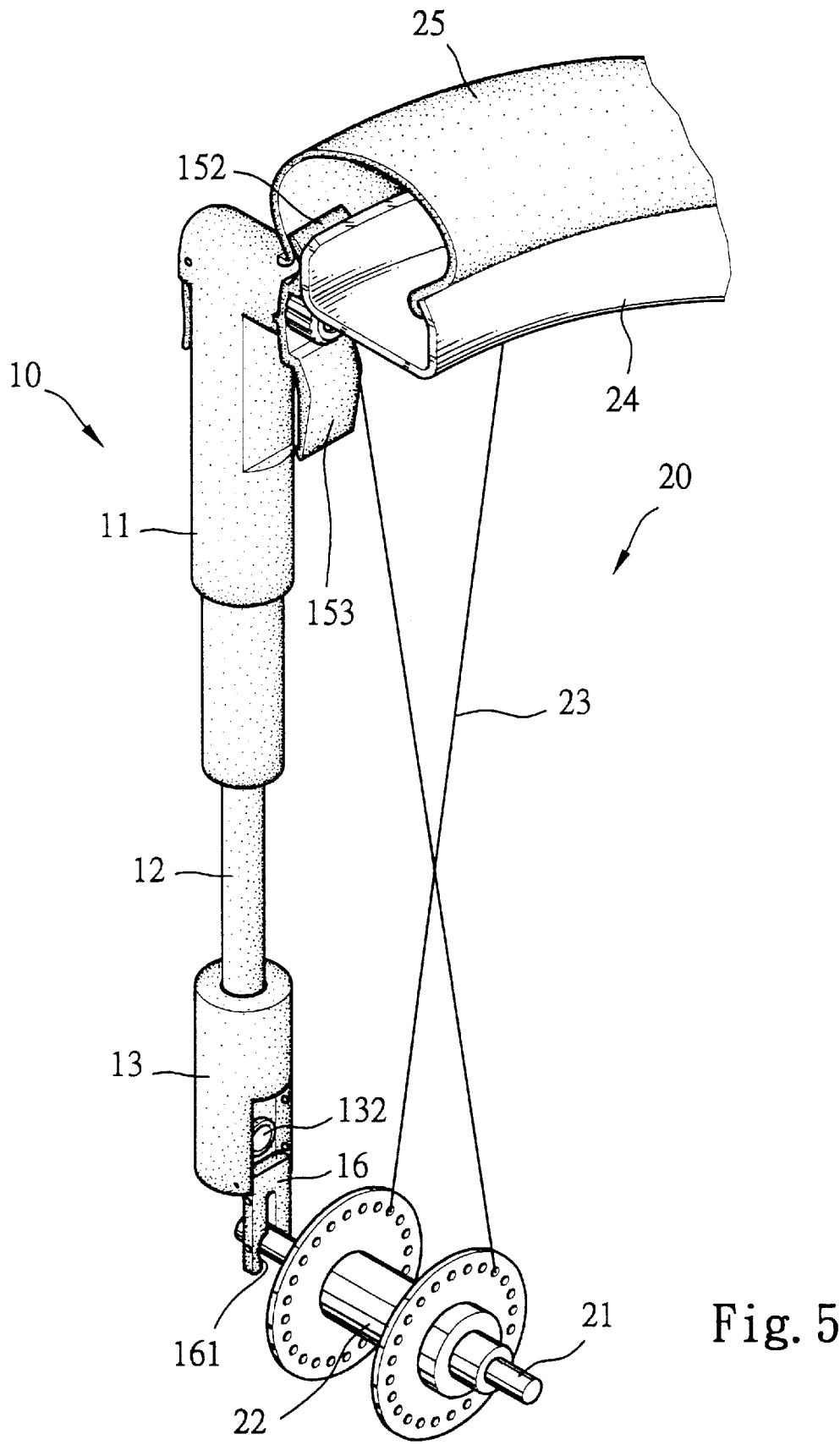
FIG. 5 is a perspective view illustrating removing of a tire from a wheel rim by the inflation/repair device in accordance with the present invention.

The inflation/repair device in FIG. 3 is in its collapsed status, and the inflation/repair device in FIG. 4 is in its most extended status. As shown in FIG. 5, a bicycle wheel generally includes an axle 21, a hub 22 mounted on the axle 21, a number of spokes 23, a rim 24, and a tire 25. When repair of the tire 25 is required, a portion of an inner peripheral end edge of the tire 25 is removed out of the rim 24 to engage with the first section 152 of the member 15. Then, the inflation/repair device is extended to a desired length and the supporting member 16 is pivoted to its operative position such that the clamping section 161 is engaged with the axle 21. Thereafter, the user may hold and rotate the pumping device 10 in a direction (either clockwise or counterclockwise) and thus urge the first section 152 to travel along the inner peripheral end edge of the tire 25 and thus remove the inner peripheral end edge of the tire 25 out of the rim 24 for repair.

Figure 6:
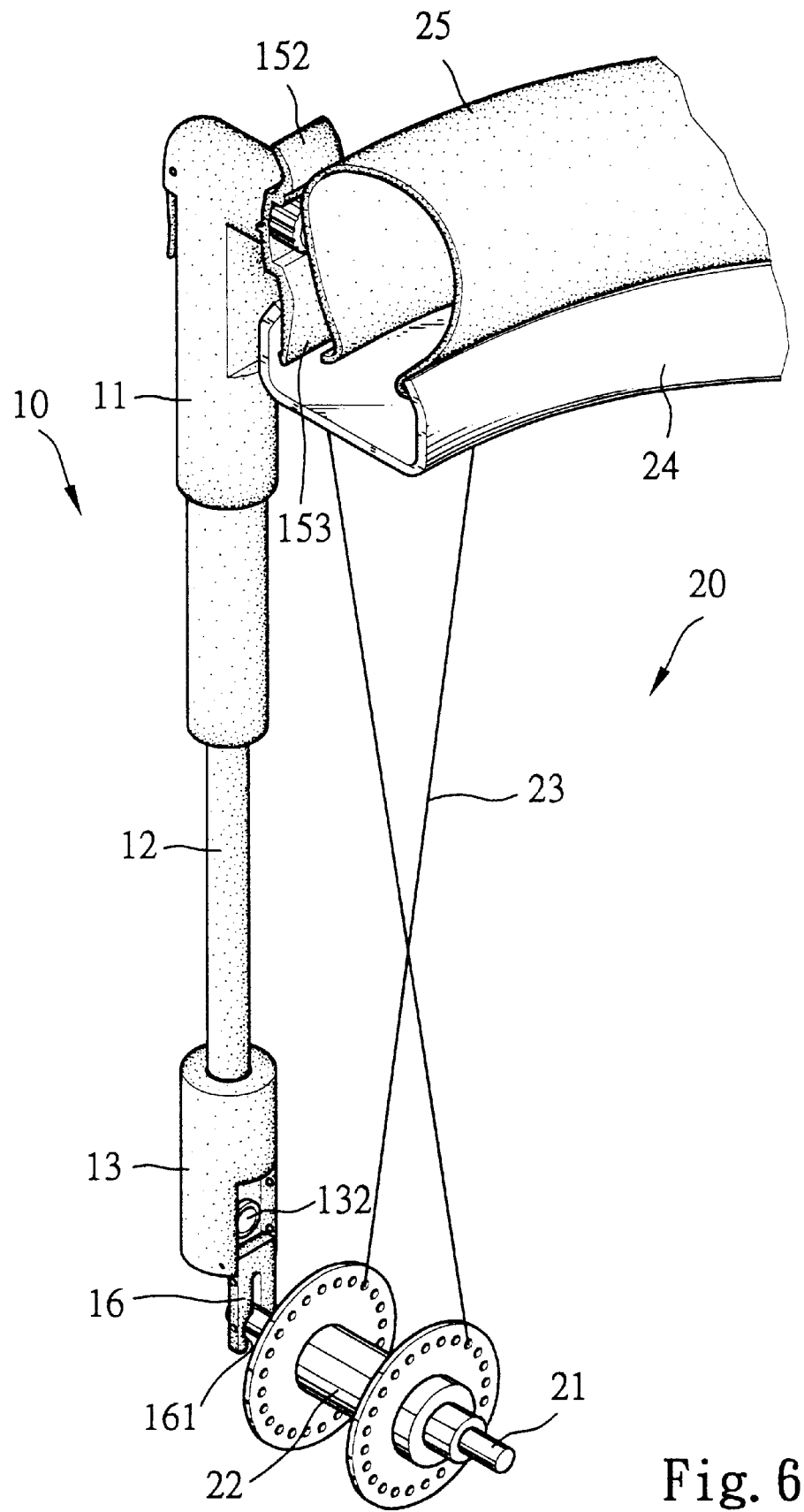
FIG. 6 is a perspective view illustrating mounting of the tire to the wheel rim by the inflation/repair device in accordance with the present invention.

After repair, as shown in FIG. 6, the inflation/repair device is further extended such that the second section 153 of the member 15 is extended into an interior of the rim 24 (adjacent to an inner periphery of the rim 24) while a portion of the inner peripheral end edge of the tire 25 is moved into the rim 24 by the second section 153 of the member 15. Then, the user may hold and rotate the pumping device 10 in a direction (either clockwise or counterclockwise) and thus urge the inner peripheral end edge of the tire 25 to be mounted into the rim 24.

By such a provision, it is appreciated that inflation/repair device of the present invention may serve as a pump as well as a repair tool. In addition, the device may be used on wheels of various diameters as the device is extendible.

Although the invention has been explained in relation to its preferred embodiment, it is to be understood that many other possible modifications and variations can be made without departing from the spirit and scope of the invention as hereinafter claimed.

What is claimed is:

1. An inflation and repair device for bicycle tires, comprising:
    a pumping device including a head having a chamber defined therein, a handle, and a piston rod assembly having a first end slidably received in the chamber of the head and a second end securely attached to the handle to move therewith thereby outputting air from the chamber, the handle including means adapted to be releasably and securely engaged with an axle of a wheel;
    a tire removing and mounting member mounted to the head and adapted to engage with an inner peripheral end edge of a tire mounted on a rim of the wheel and adapted to remove the inner peripheral end edge of the tire out of the rim and also adapted to mount the inner peripheral end edge of the tire into the rim;
    the head including a stub formed thereon, the stub including a hole communicated with the chamber of the head, and the tire removing and mounting member securely mounted around the stub.

2. The inflation and repair device as claimed in claim 1, wherein the stub includes a plurality of annularly spaced notches defined therearound, and the tire removing and mounting member including a number of protrusions formed on a side thereof, each of the protrusions respectively receivable in one of the notches.

3. The inflation and repair device as claimed in claim 1, wherein the handle includes a recess which is defined by a longitudinal wall extending along a longitudinal direction of the handle and two lateral walls transverse to the longitudinal wall, and a receptacle is defined in the longitudinal wall and adapted to receive repair pieces for flat tires;
    the means for releasably and securely engaging with the axle of the wheel includes a supporting member having an end pivotally mounted between the lateral walls defining the recess of the handle, the supporting member includes a clamping section and is movable between a stored position in which the supporting member is completely received in the recess to cover the receptacle and an operative position in which the clamping section is releasably and securely engaged with the axle of the wheel.

4. The inflation and repair device as claimed in claim 3, wherein each of said lateral walls defining the recess includes at least one knurl formed thereon, and the supporting member includes a plurality of depressions defined in each of two lateral walls thereof for releasably receiving the knurls.

* * * * *